United States Patent
Coffy et al.

(10) Patent No.: US 8,003,739 B2
(45) Date of Patent: Aug. 23, 2011

(54) MULTI-COMPONENT CATALYST SYSTEMS AND POLYMERIZATION PROCESSES FOR FORMING IN-SITU HETEROPHASIC COPOLYMERS AND/OR VARYING THE XYLENE SOLUBLES CONTENT OF POLYOLEFINS

(75) Inventors: Tim J. Coffy, Houston, TX (US); Michel Daumerie, Houston, TX (US); Kenneth P. Blackmon, Houston, TX (US); William J. Gauthier, Hoeilaart (BE); Jun Tian, League City, TX (US); Joseph L. Thorman, League City, TX (US)

(73) Assignee: Fina Technology, Inc., Houston, TX (US)

( * ) Notice: Subject to any disclaimer, the term of this patent is extended or adjusted under 35 U.S.C. 154(b) by 531 days.

(21) Appl. No.: 11/975,014

(22) Filed: Oct. 17, 2007

(65) Prior Publication Data

US 2009/0105433 A1    Apr. 23, 2009

(51) Int. Cl.
    C08F 4/653    (2006.01)
    C08F 4/6592   (2006.01)
    C08F 210/02   (2006.01)
    C08F 210/06   (2006.01)
    B01J 31/22    (2006.01)

(52) U.S. Cl. ........ 526/113; 526/160; 526/165; 526/348; 526/943

(58) Field of Classification Search .................. 526/113, 526/116, 348, 943, 160, 165
See application file for complete search history.

(56) References Cited

U.S. PATENT DOCUMENTS

| | | | |
|---|---|---|---|
| 5,847,059 A * | 12/1998 | Shamshoum et al. | 526/116 |
| 6,777,366 B2 * | 8/2004 | Gauthier et al. | 502/117 |
| 2002/0137624 A1 * | 9/2002 | Gauthier et al. | 502/117 |
| 2003/0148877 A1 | 8/2003 | Nifant'ev | |
| 2004/0138392 A1 * | 7/2004 | Jiang et al. | 526/114 |
| 2005/0159563 A1 | 7/2005 | Tharappel | |
| 2005/0234198 A1 | 10/2005 | Tian | |
| 2006/0247396 A1 | 11/2006 | Blackmon | |
| 2007/0232484 A1 | 10/2007 | Tian | |
| 2007/0255023 A1 * | 11/2007 | Razavi et al. | 526/114 |

* cited by examiner

Primary Examiner — Caixia Lu

(57) ABSTRACT

Embodiments of the invention generally include multi-component catalyst systems, polymerization processes and heterophasic copolymers formed by the processes. The multi-component catalyst system generally includes a first catalyst component selected from Ziegler-Natta catalyst systems including a diether internal electron donor and a metallocene catalyst represented by the general formula $XCp^ACp^BMA_n$, wherein X is a structural bridge, $Cp^A$ and $Cp^B$ each denote a cyclopentadienyl group or derivatives thereof, each being the same or different and which may be either substituted or unsubstituted, M is a transition metal and A is an alkyl, hydrocarbyl or halogen group and n is an integer between 0 and 4. The multi-component catalyst system further includes a second catalyst component generally represented by the formula $XCp^ACp^BMA_n$, wherein X is a structural bridge, $Cp^A$ and $Cp^B$ each denote a cyclopentadienyl group or derivatives thereof, each being the same or different and which may be either substituted or unsubstituted, M is a transition metal and A is an alkyl, hydrocarbyl or halogen group and n is an integer between 0 and 4 and wherein the second catalyst component exhibits a higher ethylene response than the first catalyst component.

21 Claims, 1 Drawing Sheet

US 8,003,739 B2

MULTI-COMPONENT CATALYST SYSTEMS AND POLYMERIZATION PROCESSES FOR FORMING IN-SITU HETEROPHASIC COPOLYMERS AND/OR VARYING THE XYLENE SOLUBLES CONTENT OF POLYOLEFINS

FIELD

Embodiments of the present invention generally relate to processes and catalyst systems for forming polyolefins. In particular, embodiments relate to multi-component catalyst systems for forming polyolefins in-situ which exhibit heterophasic properties. Embodiments further relate to processes for xylene solubles control in metallocene isotactic polypropylene.

BACKGROUND

Propylene based impact copolymers generally experience improved impact properties and are therefore suitable for a variety of applications requiring impact strength. However, such impact copolymers are generally formed in series processes (multiple reactors), requiring large capital and operating costs.

Therefore, a need exists for a process of forming polymers with improved impact properties in a single reaction zone.

SUMMARY

Embodiments of the invention generally include multi-component catalyst systems. The multi-component catalyst system generally includes a first catalyst component. In one embodiment, the first catalyst compound includes Ziegler-Natta catalyst systems including a diether internal electron donor. In another embodiment, the first catalyst component includes a metallocene catalyst represented by the general formula $XCp^A Cp^B MA_n$, wherein X is a structural bridge, $Cp^A$ and $Cp^B$ each denote a cyclopentadienyl group or derivatives thereof, each being the same or different and which may be either substituted or unsubstituted, M is a transition metal and A is an alkyl, hydrocarbyl or halogen group and n is an integer between 0 and 4. The multi-component catalyst system further includes a second catalyst component generally represented by the formula $XCp^A Cp^B MA_n$, wherein X is a structural bridge, $Cp^A$ and $Cp^B$ each denote a cyclopentadienyl group or derivatives thereof, each being the same or different and which may be either substituted or unsubstituted, M is a transition metal and A is an alkyl, hydrocarbyl or halogen group and n is an integer between 0 and 4 and wherein the second catalyst component exhibits a higher ethylene response than the first catalyst component. In one embodiment, the second catalyst component is capable of forming a higher level of xylene solubles than the first catalyst component.

One embodiment includes a process further including introducing the multi-component catalyst system to a reaction zone, introducing an olefin monomer to the reaction zone and contacting the multi-component catalyst system with the olefin monomer to form a polyolefin.

One embodiment includes a process further including introducing the multi-component catalyst system to a reaction zone, introducing propylene monomer to the reaction zone, introducing ethylene monomer to the reaction zone, contacting the multi-component catalyst system with the propylene monomer and the ethylene monomer to form a heterophasic copolymer and withdrawing the heterophasic copolymer from the reaction zone.

Embodiments further include the heterophasic copolymer formed by the processes described herein.

In one embodiment, the first catalyst component includes an isotactic directing metallocene catalyst. In one embodiment, the second catalyst component includes a syndiotactic directing metallocene catalyst.

DETAILED DESCRIPTION

Introduction and Definitions

Figure 1:
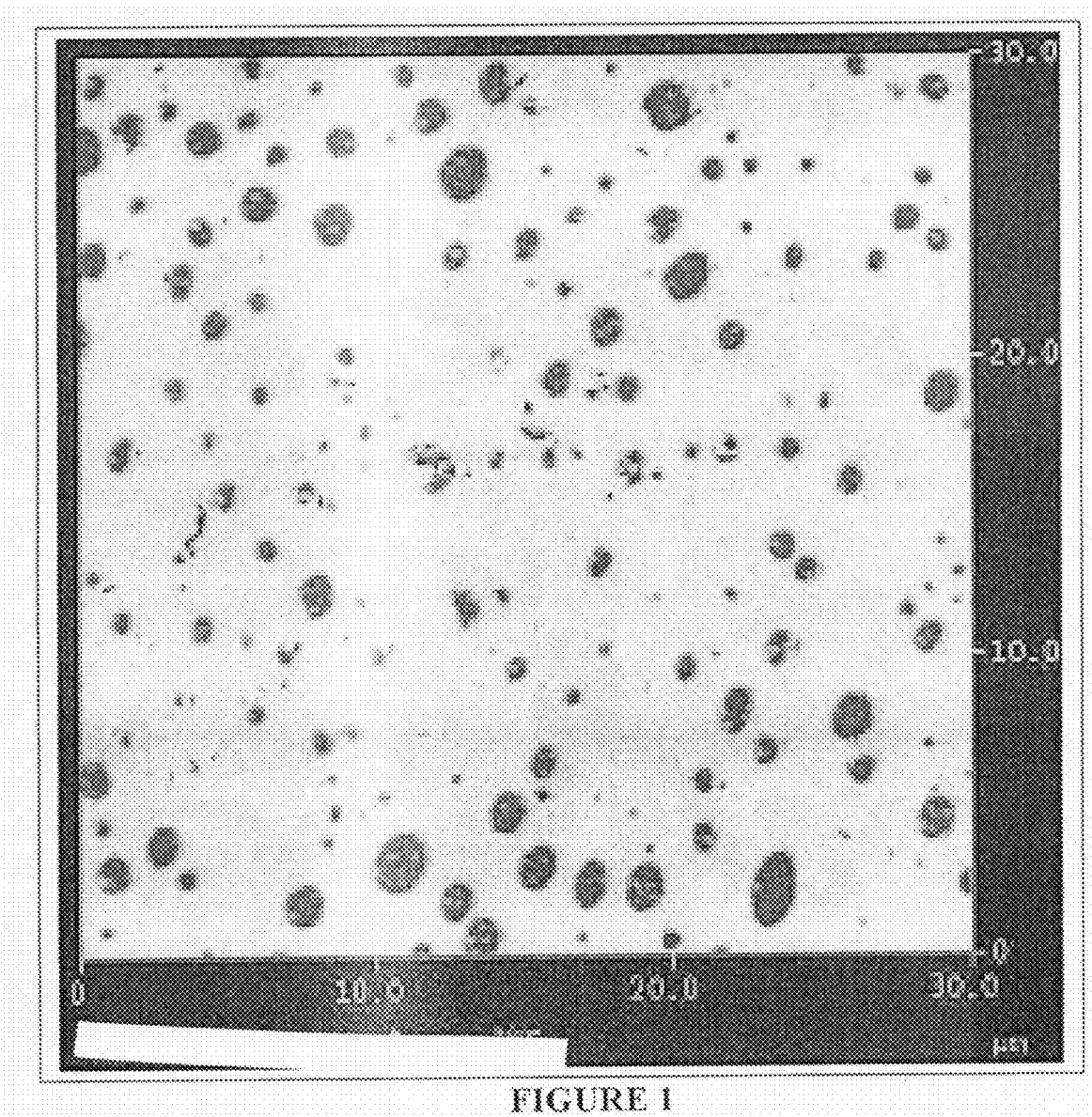
FIG. 1 illustrates an Atomic Force Microscopy (AFM) image of a random copolymer formed by embodiments of the invention.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim not defined below, it should be given the broadest definition persons in the pertinent art have given that term as reflected in printed publications and issued patents. Further, unless otherwise specified, all compounds described herein may be substituted or unsubstituted and the listing of compounds includes derivatives thereof.

Various ranges are further recited below. It should be recognized that unless stated otherwise, it is intended that the endpoints are to be interchangeable. Further, any point within that range is contemplated as being disclosed herein.

The term "activity" refers to the weight of product produced per weight of the catalyst used in a process at a standard set of conditions per unit time.

As used herein, the term "activator" is defined to be any compound or combination of compounds, supported or unsupported, which may enhance the activity and/or productivity of a catalyst compound.

Catalyst Systems

Certain polymerization processes disclosed herein involve contacting olefin monomers with a multi-component catalyst composition, sometimes also referred to herein as simply a multi-component catalyst. As used herein, the terms "multi-component catalyst composition" and "multi-component catalyst" refer to any composition, mixture or system that includes at least two different catalyst compounds. Although it is contemplated that the multi-component catalyst can include more than two different catalysts, for purposes of discussing the invention herein, only two of those catalyst compounds are described in detail herein (i.e., the "first catalyst component" and the "second catalyst component").

First Catalyst Component

The multi-component catalyst compositions described herein include a "first catalyst component". The first catalyst component generally includes catalyst systems known to one skilled in the art. For example, the first catalyst component may include metallocene catalyst systems, single site catalyst systems, Ziegler-Natta catalyst systems or combinations thereof, for example. A brief discussion of such catalyst systems is included below, but is in no way intended to limit the scope of the invention to such catalysts.

A. Ziegler-Natta Catalyst Systems

Ziegler-Natta catalyst systems are generally formed from the combination of a metal component (e.g., a potentially active catalyst site) with one or more additional components, such as a catalyst support, a cocatalyst and/or one or more electron donors, for example.

A specific example of a Ziegler-Natta catalyst includes a metal component generally represented by the formula:

$$MR_x;$$

wherein M is a transition metal, R is a halogen, an alkoxy, or a hydrocarboxyl group and x is the valence of the transition metal. For example, x may be from 1 to 4.

The transition metal may be selected from Groups IV through VIB (e.g., titanium, chromium or vanadium), for example. R may be selected from chlorine, bromine, carbonate, ester, or an alkoxy group in one embodiment. Examples of catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$, for example.

Those skilled in the art will recognize that a catalyst may be "activated" in some way before it is useful for promoting polymerization. As discussed further below, activation may be accomplished by contacting the catalyst with an activator, which is also referred to in some instances as a "cocatalyst". Embodiments of such Z-N activators include organoaluminum compounds, such as trimethyl aluminum (TMA), triethyl aluminum (TEAl) and triisobutyl aluminum (TiBAl), for example.

The Ziegler-Natta catalyst system further includes one or more electron donors, such as internal electron donors. Internal electron donors may be used to reduce the atactic form of the resulting polymer, thus decreasing the amount of xylene soluble material in the polymer. While the Ziegler-Natta catalyst system includes internal electron donor(s), in one specific embodiment, the Ziegler-Natta catalyst system generally is absent external electron donors. For example, the Ziegler-Natta catalyst system may include one or more internal donors, wherein the internal donors do not provide a detrimental effect to the second catalyst component (described in further detail below), such as terminating the activity thereof. In one specific embodiment, the internal electron donor includes diethers, for example.

The components of the Ziegler-Natta catalyst system (e.g., catalyst, activator and/or electron donors) may or may not be associated with a support, either in combination with each other or separate from one another. The Ziegler-Natta support materials may include a magnesium dihalide, such as magnesium dichloride or magnesium dibromide, or silica, for example.

The Ziegler-Natta catalyst may be formed by any method known to one skilled in the art. For example, the Ziegler-Natta catalyst may be formed by contacting a transition metal halide with a metal alkyl or metal hydride. (See, U.S. Pat. No. 4,298,718, U.S. Pat. No. 4,298,718, U.S. Pat. No. 4,544,717, U.S. Pat. No. 4,767,735, and U.S. Pat. No. 4,544,717, which are incorporated by reference herein.)

B. Metallocene Catalyst Systems

Metallocene catalysts may be characterized generally as coordination compounds incorporating one or more cyclopentadienyl (Cp) groups (which may be substituted or unsubstituted, each substitution being the same or different) coordinated with a transition metal through π bonding.

The substituent groups on Cp may be linear, branched or cyclic hydrocarbyl radicals, for example. The inclusion of cyclic hydrocarbyl radicals may transform the Cp into other contiguous ring structures, such as indenyl, azulenyl and fluorenyl groups, for example. These contiguous ring structures may also be substituted or unsubstituted by hydrocarbyl radicals, such as $C_1$ to $C_{20}$ hydrocarbyl radicals, for example.

A specific, non-limiting, example of a metallocene catalyst is a bulky ligand metallocene compound generally represented by the formula:

$$[L]_mM[A]_n;$$

wherein L is a bulky ligand, A is a leaving group, M is a transition metal and m and n are such that the total ligand valency corresponds to the transition metal valency. For example m may be from 1 to 4 and n may be from 1 to 3.

The metal atom "M" of the metallocene catalyst compound, as described throughout the specification and claims, may be selected from Groups 3 through 12 atoms and lanthanide Group atoms, or from Groups 3 through 10 atoms or from Sc, Ti, Zr, Hf, V, Nb, Ta, Mn, Re, Fe, Ru, Os, Co, Rh, Ir and Ni. The oxidation state of the metal atom "M" may range from 0 to +7 or is +1, +2, +3, +4 or +5, for example.

The bulky ligand generally includes a cyclopentadienyl group (Cp) or a derivative thereof. The Cp ligand(s) form at least one chemical bond with the metal atom M to form the "metallocene catalyst." The Cp ligands are distinct from the leaving groups bound to the catalyst compound in that they are not highly susceptible to substitution/abstraction reactions.

Cp ligands may include ring(s) or ring system(s) including atoms selected from group 13 to 16 atoms, such as carbon, nitrogen, oxygen, silicon, sulfur, phosphorous, germanium, boron, aluminum and combinations thereof, wherein carbon makes up at least 50% of the ring members. Non-limiting examples of the ring or ring systems include cyclopentadienyl, cyclopentaphenanthreneyl, indenyl, benzindenyl, fluorenyl, tetrahydroindenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl or "$H_4Ind$"), substituted versions thereof and heterocyclic versions thereof, for example.

Cp substituent groups may include hydrogen radicals, alkyls (e.g., methyl, ethyl, propyl, butyl, pentyl, hexyl, fluoromethyl, fluoroethyl, difluoroethyl, iodopropyl, bromohexyl, benzyl, phenyl, methylphenyl, tert-butylphenyl, chlorobenzyl, dimethylphosphine and methylphenylphosphine), alkenyls (e.g., 3-butenyl, 2-propenyl and 5-hexenyl), alkynyls, cycloalkyls (e.g., cyclopentyl and cyclohexyl), aryls (e.g., trimethylsilyl, trimethylgermyl, methyldiethylsilyl, acyls, aroyls, tris(trifluoromethyl)silyl, methylbis(difluoromethyl)silyl and bromomethyldimethylgermyl), alkoxys (e.g., methoxy, ethoxy, propoxy and phenoxy), aryloxys, alkylthiols, dialkylamines (e.g., dimethylamine and diphenylamine), alkylamidos, alkoxycarbonyls, aryloxycarbonyls, carbomoyls, alkyl- and dialkyl-carbamoyls, acyloxys, acylaminos, aroylaminos, organometalloid radicals (e.g., dimethylboron), Group 15 and Group 16 radicals (e.g., methylsulfide and ethylsulfide) and combinations thereof, for example. In one embodiment, at least two substituent groups, two adjacent substituent groups in one embodiment, are joined to form a ring structure.

Each leaving group "A" is independently selected and may include any ionic leaving group, such as halogens (e.g., chloride and fluoride), hydrides, $C_1$ to $C_{12}$ alkyls (e.g., methyl, ethyl, propyl, phenyl, cyclobutyl, cyclohexyl, heptyl, tolyl, trifluoromethyl, methylphenyl, dimethylphenyl and trimethylphenyl), $C_2$ to $C_{12}$ alkenyls (e.g., $C_2$ to $C_6$ fluoroalkenyls), $C_6$ to $C_{12}$ aryls (e.g., $C_7$ to $C_{20}$ alkylaryls), $C_1$ to $C_{12}$ alkoxys (e.g., phenoxy, methyoxy, ethyoxy, propoxy and benzoxy), $C_6$ to $C_{16}$ aryloxys, $C_7$ to $C_{18}$ alkylaryloxys and $C_1$ to $C_{12}$ heteroatom-containing hydrocarbons and substituted derivatives thereof, for example.

Other non-limiting examples of leaving groups include amines, phosphines, ethers, carboxylates (e.g., $C_1$ to $C_6$ alkylcarboxylates, $C_6$ to $C_{12}$ arylcarboxylates and $C_7$ to $C_{18}$ alkylarylcarboxylates), dienes, alkenes (e.g., tetramethylene, pentamethylene, methylidene), hydrocarbon radicals having from 1 to 20 carbon atoms (e.g., pentafluorophenyl) and combinations thereof, for example. In one embodiment, two or more leaving groups form a part of a fused ring or ring system.

In a specific embodiment, L and A may be bridged to one another to form a bridged metallocene catalyst. A bridged metallocene catalyst, for example, may be described by the general formula:

$$XCp^ACp^BMA_n;$$

wherein X is a structural bridge, $Cp^A$ and $Cp^B$ each denote a cyclopentadienyl group or derivatives thereof, each being the same or different and which may be either substituted or unsubstituted, M is a transition metal and A is an alkyl, hydrocarbyl or halogen group and n is an integer between 0 and 4, and either 1 or 2 in a particular embodiment.

Non-limiting examples of bridging groups "X" include divalent hydrocarbon groups containing at least one Group 13 to 16 atom, such as, but not limited to, at least one of a carbon, oxygen, nitrogen, silicon, aluminum, boron, germanium, tin and combinations thereof; wherein the heteroatom may also be a $C_1$ to $C_{12}$ alkyl or aryl group substituted to satisfy a neutral valency. The bridging group may also contain substituent groups as defined above including halogen radicals and iron. More particular non-limiting examples of bridging group are represented by $C_1$ to $C_6$ alkylenes, substituted $C_1$ to $C_6$ alkylenes, oxygen, sulfur, $R_2C=$, $R_2Si=$, $-Si(R)_2Si(R_2)-$, $R_2Ge=$ or $RP=$ (wherein "=" represents two chemical bonds), where R is independently selected from hydrides, hydrocarbyls, halocarbyls, hydrocarbyl-substituted organometalloids, halocarbyl-substituted organometalloids, disubstituted boron atoms, disubstituted Group 15 atoms, substituted Group 16 atoms and halogen radicals, for example. In one embodiment, the bridged metallocene catalyst component has two or more bridging groups.

Other non-limiting examples of bridging groups include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis(trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties, wherein the Si atom is replaced by a Ge or a C atom; dimethylsilyl, diethylsilyl, dimethylgermyl and/or diethylgermyl.

In another embodiment, the bridging group may also be cyclic and include 4 to 10 ring members or 5 to 7 ring members, for example. The ring members may be selected from the elements mentioned above and/or from one or more of boron, carbon, silicon, germanium, nitrogen and oxygen, for example. Non-limiting examples of ring structures which may be present as or part of the bridging moiety are cyclobutylidene, cyclopentylidene, cyclohexylidene, cycloheptylidene, cyclooctylidene, for example. The cyclic bridging groups may be saturated or unsaturated and/or carry one or more substituents and/or be fused to one or more other ring structures. The one or more Cp groups which the above cyclic bridging moieties may optionally be fused to may be saturated or unsaturated. Moreover, these ring structures may themselves be fused, such as, for example, in the case of a naphthyl group.

In one embodiment, the metallocene catalyst includes CpFlu Type catalysts (e.g., a metallocene catalyst wherein the ligand includes a Cp fluorenyl ligand structure) represented by the following formula:

$$X(CpR^1{}_nR^2{}_m)(FlR^3{}_p);$$

wherein Cp is a cyclopentadienyl group or derivatives thereof, Fl is a fluorenyl group, X is a structural bridge between Cp and Fl, $R^1$ is an optional substituent on the Cp, n is 1 or 2, $R^2$ is an optional substituent on the Cp bound to a carbon immediately adjacent to the ipso carbon, m is 1 or 2 and each $R^3$ is optional, may be the same or different and may be selected from C1 to C20 hydrocarbyls. In one embodiment, at least one $R^3$ is substituted in the para position on the fluorenyl group and at least one other $R^3$ being substituted at an opposed para position on the fluorenyl group and p is 2 or 4.

In yet another aspect, the metallocene catalyst includes bridged mono-ligand metallocene compounds (e.g., mono cyclopentadienyl catalyst components). In this embodiment, the metallocene catalyst is a bridged "half-sandwich" metallocene catalyst. In yet another aspect of the invention, the at least one metallocene catalyst component is an unbridged "half sandwich" metallocene. (See, U.S. Pat. No. 6,069,213, U.S. Pat. No. 5,026,798, U.S. Pat. No. 5,703,187, U.S. Pat. No. 5,747,406, U.S. Pat. No. 5,026,798 and U.S. Pat. No. 6,069,213, which are incorporated by reference herein.)

Non-limiting examples of metallocene catalyst components consistent with the description herein include, for example cyclopentadienylzirconium$A_n$; indenylzirconium$A_n$; (1-methylindenyl)zirconium$A_n$; (2-methylindenyl)zirconium$A_n$, (1-propylindenyl)zirconium$A_n$; (2-propylindenyl)zirconium$A_n$; (1-butylindenyl)zirconium$A_n$; (2-butylindenyl)zirconium$A_n$; methylcyclopentadienylzirconium$A_n$; tetrahydroindenylzirconium$A_n$; pentamethylcyclopentadienylzirconium$A_n$; cyclopentadienylzirconium$A_n$; pentamethylcyclopentadienyltitanium$A_n$; tetramethylcyclopentyltitanium$A_n$; (1,2,4-trimethylcyclopentadienyl)zirconium$A_n$; dimethylsilyl(1,2,3,4-tetramethylcyclopentadienyl)(cyclopentadienyl)zirconium$A_n$; dimethylsilyl(1,2,3,4-tetramethylcyclopentadienyl)(1,2,3-trimethylcyclopentadienyl)zirconium$A_n$; dimethylsilyl(1,2,3,4-tetramethylcyclopentadienyl)(1,2-dimethylcyclopentadienyl)zirconium$A_n$; dimethylsilyl(1,2,3,4-tetramethylcyclopentadienyl)(2-methylcyclopentadienyl)zirconium$A_n$; dimethylsilylcyclopentadienylindenylzirconium$A_n$; dimethylsilyl(2-methylindenyl)(fluorenyl)zirconium$A_n$; diphenylsilyl(1,2,3,4-tetramethylcyclopentadienyl)(3-propylcyclopentadienyl)zirconium$A_n$; dimethylsilyl (1,2,3,4-tetramethylcyclopentadienyl)(3-t-butylcyclopentadienyl)

zirconium$A_n$; dimethylgermyl(1,2-dimethylcyclopentadienyl)(3-isopropylcyclopentadienyl)zirconium$A_n$; dimethylsilyl(1,2,3,4-tetramethylcyclopentadienyl)(3-methylcyclopentadienyl)zirconium$A_n$; diphenylmethylidene(cyclopentadienyl)(9-fluorenyl)zirconium$A_n$; diphenylmethylidenecyclopentadienylindenylzirconium$A_n$; isopropylidenebiscyclopentadienylzirconium$A_n$; isopropylidene(cyclopentadienyl)(9-fluorenyl)zirconium$A_n$; isopropylidene(3-methylcyclopentadienyl)(9-fluorenyl)zirconium$A_n$; ethylenebis(9-fluorenyl)zirconium$A_n$; ethylenebis(1-indenyl)zirconium$A_n$; ethylenebis(1-indenyl)zirconium$A_n$; ethylenebis(2-methyl-1-indenyl)zirconium$A_n$; ethylenebis(2-methyl-4,5,6,7-tetrahydro-1-indenyl)zirconium$A_n$; ethylenebis(2-propyl-4,5,6,7-tetrahydro-1-indenyl)zirconium$A_n$; ethylenebis(2-isopropyl-4,5,6,7-tetrahydro-1-indenyl)zirconium$A_n$; ethylenebis(2-butyl-4,5,6,7-tetrahydro-1-indenyl)zirconium$A_n$; ethylenebis(2-isobutyl-4,5,6,7-tetrahydro-1-indenyl)zirconium$A_n$; dimethylsilyl(4,5,6,7-tetrahydro-1-indenyl)zirconium$A_n$; diphenyl(4,5,6,7-tetrahydro-1-indenyl)zirconium$A_n$; ethylenebis(4,5,6,7-tetrahydro-1-indenyl)zirconium$A_n$; dimethylsilylbis(cyclopentadienyl)zirconium$A_n$; dimethylsilylbis(9-fluorenyl)zirconium$A_n$; dimethylsilylbis(1-indenyl)zirconium$A_n$; dimethylsilylbis(2-methylindenyl)zirconium$A_n$; dimethylsilylbis(2-propyl-indenyl)zirconium$A_n$; dimethylsilylbis(2-butylindenyl)zirconium$A_n$; diphenylsilylbis(2-methylindenyl)zirconium$A_n$; diphenylsilylbis(2-propylindenyl)zirconium$A_n$; diphenylsilylbis(2-butylindenyl)zirconium$A_n$; dimethylgermylbis(2-methylindenyl)zirconium$A_n$; dimethylsilylbistetrahydroindenylzirconium$A_n$; dimethylsilylbistetramethylcyclopentadienylzirconium$A_n$; dimethylsilyl(cyclopentadienyl)(9-fluorenyl)zirconium$A_n$; diphenylsilyl(cyclopentadienyl)(9-fluorenyl)zirconium$A_n$; diphenylsilylbisindenylzirconium$A_n$; cyclotrimethylenesilyltetramethylcyclopentadienylcyclopentadienylzirconium$A_n$; cyclotetramethylenesilyltetramethylcyclopentadienylcyclopentadienylzirconium$A_n$; cyclotrimethylenesilyl(tetramethylcyclopentadienyl)(2-methylindenyl)zirconium$A_n$; cyclotrimethylenesilyl(tetramethylcyclopentadienyl)(3-methylcyclopentadienyl)zirconium$A_n$; cyclotrimethylenesilylbis(2-methylindenyl)zirconium$A_n$; cyclotrimethylenesilyl(tetramethylcyclopentadienyl)(2,3,5-trimethylcyclopentadienyl)zirconium$A_n$; cyclotrimethylenesilylbis(tetramethylcyclopentadienyl)zirconium$A_n$; dimethylsilyl(tetramethylcyclopentadieneyl)(N-tertbutylamido)titanium$A_n$; biscyclopentadienylchromium$A_n$; biscyclopentadienylzirconium$A_n$; bis(n-butylcyclopentadienyl)zirconium$A_n$; bis(n-dodecyclcyclopentadienyl)zirconium$A_n$; bisethylcyclopentadienylzirconium$A_n$; bisisobutylcyclopentadienylzirconium$A_n$; bisisopropylcyclopentadienylzirconium$A_n$; bismethylcyclopentadienylzirconium$A_n$; bisoctylcyclopentadienylzirconium$A_n$; bis(n-pentylcyclopentadienyl)zirconium$A_n$; bis(n-propylcyclopentadienyl)zirconium$A_n$; bistrimethylsilylcyclopentadienylzirconium$A_n$; bis(1,3-bis(trimethylsilyl)cyclopentadienyl)zirconium$A_n$; bis(1-ethyl-2-methylcyclopentadienyl)zirconium$A_n$; bis(1-ethyl-3-methylcyclopentadienyl)zirconium$A_n$; bispentamethylcyclopentadienylzirconium$A_n$; bispentamethylcyclopentadienylzirconium$A_n$; bis(1-propyl-3-methylcyclopentadienyl)zirconium$A_n$; bis(1-n-butyl-3-methylcyclopentadienyl)zirconium$A_n$; bis(1-isobutyl-3-methylcyclopentadienyl)zirconium$A_n$; bis(1-propyl-3-butylcyclopentadienyl)zirconium$A_n$; bis(1,3-n-butylcyclopentadienyl)zirconium$A_n$; bis(4,7-dimethylindenyl)zirconium$A_n$; bisindenylzirconium$A_n$; bis(2-methylindenyl)zirconium$A_n$; cyclopentadienylindenylzirconium$A_n$; bis(n-propylcyclopentadienyl)hafnium$A_n$; bis(n-butylcyclopentadienyl)hafnium$A_n$; bis(n-pentylcyclopentadienyl)hafnium$A_n$; (n-propylcyclopentadienyl)(n-butylcyclopentadienyl)hafnium$A_n$; bis[(2-trimethylsilylethyl)cyclopentadienyl]hafnium$A_n$; bis(trimethylsilylcyclopentadienyl)hafnium$A_n$; bis(2-n-propylindenyl)hafnium$A_n$; bis(2-n-butylindenyl)hafnium$A_n$; dimethylsilylbis(n-propylcyclopentadienyl)hafnium$A_n$; dimethylsilylbis(n-butylcyclopentadienyl)hafnium$A_n$; bis(9-n-propylfluorenyl)hafnium$A_n$; bis(9-n-butylfluorenyl)hafnium$A_n$; (9-n-propylfluorenyl)(2-n-propylindenyl)hafnium$A_n$; bis(1-n-propyl-2-methylcyclopentadienyl)hafnium$A_n$; (n-propylcyclopentadienyl)(1-n-propyl-3-n-butylcyclopentadienyl)hafnium$A_n$; dimethylsilyltetramethylcyclopentadienylcyclopropylamidotitanium$A_n$; dimethylsilyltetramethylcyclopentadienylcyclobutylamidotitanium$A_n$; dimethylsilyltetramethylcyclopentadienylcyclopentylamidotitanium$A_n$; dimethylsilyltetramethylcyclopentadienylcyclohexylamidotitanium$A_n$; dimethylsilyltetramethylcyclopentadienylcycloheptylamidotitanium$A_n$; dimethylsilyltetramethylcyclopentadienylcyclooctylamidotitanium$A_n$; dimethylsilyltetramethylcyclopentadienylcyclononylamidotitanium$A_n$; dimethylsilyltetramethylcyclopentadienylcyclodecylamidotitanium$A_n$; dimethylsilyltetramethylcyclopentadienylcycloundecylamidotitanium$A_n$; dimethylsilyltetramethylcyclopentadienylcyclododecylamidotitanium$A_n$; dimethylsilyltetramethylcyclopentadienyl(sec-butylamido)titanium$A_n$; dimethylsilyl(tetramethylcyclopentadienyl)(n-octylamido)titanium$A_n$; dimethylsilyl(tetramethylcyclopentadienyl)(n-decylamido)titanium$A_n$; dimethylsilyl(tetramethylcyclopentadienyl)(n-octadecylamido)titanium$A_n$; dimethylsilylbis(cyclopentadienyl)zirconium$A_n$; dimethylsilylbis(tetramethylcyclopentadienyl)zirconium$A_n$; dimethylsilylbis(methylcyclopentadienyl)zirconium$A_n$; dimethylsilylbis(dimethylcyclopentadienyl)zirconium$A_n$; dimethylsilyl(2,4-dimethylcyclopentadienyl) (3',5'-dimethylcyclopentadienyl)zirconium$A_n$; dimethylsilyl(2,3,5-trimethylcyclopentadienyl)(2',4',5'-dimethylcyclopentadienyl)zirconium$A_n$; dimethylsilylbis(t-butylcyclopentadienyl)zirconium$A_n$; dimethylsilylbis(trimethylsilylcyclopentadienyl)zirconium$A_n$; dimethylsilylbis(2-trimethylsilyl-4-t-butylcyclopentadienyl)zirconium$A_n$; dimethylsilylbis(4,5,6,7-tetrahydro-indenyl)zirconium$A_n$; dimethylsilylbis(indenyl)zirconium$A_n$; dimethylsilylbis(2-methylindenyl)zirconium$A_n$; dimethylsilylbis(2,4-dimethylindenyl)zirconium$A_n$; dimethylsilylbis(2,4,7-trimethylindenyl)zirconium$A_n$; dimethylsilylbis(2-methyl-4-phenylindenyl)zirconium$A_n$; dimethylsilylbis(2-ethyl-4-phenylindenyl)zirconium$A_n$; dimethylsilylbis(benz[e]indenyl)zirconium$A_n$; dimethylsilylbis(2-methylbenz[e]indenyl)zirconium$A_n$; dimethylsilylbis(benz[f]indenyl)zirconium$A_n$; dimethylsilylbis(2-methylbenz[f]indenyl)zirconium$A_n$; dimethylsilylbis(3-methylbenz[f]indenyl)zirconium$A_n$; dimethylsilylbis(cyclopenta[cd]indenyl)zirconium$A_n$; dimethylsilylbis(cyclopentadienyl)zirconium$A_n$; dimethylsilylbis(tetramethylcyclopentadienyl)zirconium$A_n$; dimethylsilylbis(methylcyclopentadienyl)zirconium$A_n$; dimethylsilylbis(dimethylcyclopentadienyl)zirconium$A_n$; isopropylidene(cyclopentadienyl-fluorenyl)zirconium$A_n$; isopropylidene(cyclopentadienyl-indenyl)zirconium$A_n$; isopropylidene(cyclopentadienyl-2,7-di-t-butylfluorenyl)zirconium$A_n$; isopropylidene(cyclopentadienyl-3-methylfluorenyl)zirconium$A_n$; isoropylidene(cyclopentadienyl-4-methylfluorenyl)zirconium$A_n$; isopropylidene(cyclopentadienyl-octahydrofluorenyl)zirconium$A_n$; isopropylidene(methylcyclopentadienyl-fluorenyl)zirconium$A_n$; isopropylidene(dimethylcyclopentadienylfluorenyl)zirconium$A_n$; isopropylidene(tetramethylcyclopentadienyl-fluorenyl)zirconium$A_n$; diphenylmethylene(cyclopentadienyl-fluorenyl)zirconium$A_n$; diphenylmethylene(cyclopentadienyl-indenyl)zirconium$A_n$; diphenylmethylene(cyclopentadienyl-2,7-di-t-butylfluorenyl)zirconium$A_n$; diphenylmethylene(cyclopentadienyl-3-methylfluorenyl)zirconium$A_n$; diphenylmethylene(cyclopentadienyl-4-methylfluorenyl)zirconium$A_n$; diphenylmethylene(cyclopentadienyloctahydrofluorenyl)zirconium$A_n$; diphenylmethylene(methylcyclopentadienyl-fluorenyl)zirconium$A_n$; diphenylmethylene(dimethylcyclopentadienyl-fluorenyl)zirconium$A_n$; diphenylmethylene(tetramethylcyclopentadienyl-fluorenyl)zirconium$A_n$; cyclohexylidene(cyclopentadienyl-fluorenyl)zirconium$A_n$; cyclohexylidene(cyclopentadienylindenyl)zirconium$A_n$; cyclohexylidene(cyclopentadienyl-2,7-di-t-butylfluorenyl)zirconium$A_n$; cyclohexylidene(cyclopentadienyl-3-methylfluorenyl)zirconium$A_n$; cyclohexylidene(cyclopentadienyl-4-methylfluorenyl)zirconium$A_n$; cyclohexylidene(cyclopentadienyloctahydrofluorenyl)zirconium$A_n$; cyclohexylidene(methylcyclopentadienylfluorenyl)zirconium$A_n$; cyclohexylidene(dimethylcyclopentadienyl-fluorenyl)zirconium$A_n$; cyclohexylidene(tetramethylcyclopentadienylfluorenyl)zirconium$A_n$; dimethylsilyl(cyclopentadienyl-fluorenyl)zirconium$A_n$; dimethylsilyl(cyclopentadienyl-indenyl)zirconium$A_n$; dimethylsilyl(cyclopentdienyl-2,7-di-t-butylfluorenyl)zirconium$A_n$; dimethylsilyl(cyclopentadienyl-3-methylfluorenyl)zirconium$A_n$; dimethylsilyl(cyclopentadienyl-4-methylfluorenyl)zirconium$A_n$; dimethylsilyl(cyclopentadienyl-octahydrofluorenyl)zirconium$A_n$; dimethylsilyl(methylcyclopentanedienyl-fluorenyl)zirconium$A_n$; dimethylsilyl(dimethylcyclopentadienylfluorenyl)zirconium$A_n$; dimethylsilyl(tetramethylcyclopentadienylfluorenyl)zirconium$A_n$; isopropylidene(cyclopentadienyl-fluorenyl)zirconium$A_n$; isopropylidene(cyclopentadienyl-indenyl)zirconium$A_n$; isopropylidene(cyclopentadienyl-2,7-di-t-butylfluorenyl)zirconium$A_n$; cyclohexylidene(cyclopentadienylfluorenyl)zirconium$A_n$; cyclohexylidene(cyclopentadienyl-2,7-di-t-butylfluorenyl)zirconium$A_n$; dimethylsilyl(cyclopentadienylfluorenyl)zirconium$A_n$; methylphenylsilyltetramethylcyclopentadienylcyclopropylamidotitanium$A_n$; methylphenylsilyltetramethylcyclopentadienylcyclobutylamidotitanium$A_n$; methylphenylsilyltetramethylcyclopentadienylcyclopentylamidotitanium$A_n$; methylphenylsilyltetramethylcyclopentadienylcyclohexylamidotitanium$A_n$; methylphenylsilyltetramethylcyclopentadienylcycloheptylamidotitanium$A_n$; methylphenylsilyltetramethylcyclopentadienylcyclooctylamidotitanium$A_n$; methylphenylsilyltetramethylcyclopentadienylcyclononylamidotitanium$A_n$; methylphenylsilyltetramethylcyclopentadienylcyclodecylamidotitanium$A_n$; methylphenylsilyltetramethylcyclopentadienylcycloundecylamidotitanium$A_n$; methylphenylsilyltetramethylcyclopentadienylcyclododecylamidotitanium$A_n$; methylphenylsilyl(tetramethylcyclopentadienyl)(sec-butylamido)titanium$A_n$; methylphenylsilyl(tetramethylcyclopentadienyl)(n-octylamido)titanium$A_n$; methylphenylsilyl(tetramethylcyclopentadienyl)(n-decylamido)titanium$A_n$; methylphenylsilyl(tetramethylcyclopentadienyl)(n-octadecylamido)titanium$A_n$; diphenylsilyltetramethylcyclopentadienylcyclopropylamidotitanium$A_n$; diphenylsilyltetramethylcyclopentadienylcyclobutylamidotitanium$A_n$; diphenylsilyltetramethylcyclopentadienylcyclopentylamidotitanium$A_n$; diphenylsilyltetramethylcyclopentadienylcyclohexylamidotitanium$A_n$; diphenylsilyltetramethylcyclopentadienylcycloheptylamidotitanium$A_n$; diphenylsilyltetramethylcyclopentadienylcyclooctylamidotitanium$A_n$; diphenylsilyltetramethylcyclopentadienylcyclononylamidotitanium$A_n$; diphenylsilyltetramethylcyclopentadienylcyclodecylamidotitanium$A_n$; diphenylsilyltetramethylcyclopentadienylcycloundecylamidotitanium$A_n$; diphenylsilyltetramethylcyclopentadienylcyclododecylamidotitanium$A_n$; diphenylsilyl(tetramethylcyclopentadienyl)(sec-butylamido)titanium$A_n$; diphenylsilyl(tetramethylcyclopentadienyl)(n-octylamido)titanium$A_n$; diphenylsilyl(tetramethylcyclopentadienyl)(n-decylamido)titanium$A_n$; and diphenylsilyl(tetramethylcyclopentadienyl)(n-octadecylamido)titanium$A_n$.

In one specific embodiment, the first catalyst component includes an isospecific metallocene catalyst (e.g., a catalyst capable of forming isotactic polypropylene (isotactic directing)), such as dimethylsilylbis(2-methyl-4-phenyl-indenyl) zirconium dichloride, dimethylsilylbis(2-methyl-indenyl) zirconium dichloride, dimethylsilylbis(2-methyl-4,5-benzoindenyl)zirconium dichloride, for example. In one specific embodiment, the first catalyst component comprises dimethylsilylbis(2-methyl-4-phenyl-indenyl)zirconium dichloride, for example.

In one embodiment, the first catalyst component includes a metallocene catalyst capable of producing a propylene homopolymer having a high melting point (e.g., a $T_m$ of at least about 120° C., or from about 135° C. to about 160° C. or 167° C. or from about 140° C. to about 155° C. or 160° C.).

Second Catalyst Component

In addition to the first catalyst component, the multi-component catalyst compositions include a "second catalyst component".

The second catalyst component generally includes a metallocene catalyst as described above. However, in one specific embodiment, the second catalyst component exhibits the ability to incorporate ethylene at a higher level than the first catalyst component (hereinafter referred to as ethylene response). For example, the second catalyst component may be capable of at least about 70%, or at least about 80%, or at least about 85% or at least about 90% ethylene incorporation (incorporates at least the specified percentage of the ethylene in the monomer feed into the polymer product).

The second catalyst component may further be capable of producing a higher xylene solubles content in the polymer than the first catalyst component. For example, the second catalyst component may be capable of producing a xylene solubles level of greater than about 3 wt. %, or about 4 wt. % or about 5 wt. %.

In one or more embodiments, the second catalyst component is a syndiotactic directing catalyst. For example, the second catalyst component may include diphenylmethylene (fluorenyl)(cyclopentadienyl) zirconium dichloride, diphenylmethylene (2,7-di-tert-butyl-fluorenyl)(cyclopentadienyl) zirconium dichloride, diphenylmethylene (3,6-di-tert-butyl-fluorenyl)(cyclopentadienyl) zirconium dichloride or combinations thereof.

In one embodiment, the second catalyst component includes CpFlu type catalysts, as described in detail above. For example, the second catalyst component may include dimethylmethylene (fluorenyl)(2-methyl-4-tert-butyl-cyclopentadienyl) zirconium dichloride, dimethylmethylene (3,6-di-tert-butyl-fluorenyl)(2-methyl-4-tert-butyl-cyclopentadienyl) zirconium dichloride, dimethylmethylene (2,7-di-tert-butyl-fluorenyl)(2-methyl-4-tert-butyl-cyclopentadienyl) zirconium dichloride or combinations thereof.

The multi-component catalyst system may include the second catalyst component in an amount of from about 20 wt. % to about 95 wt. %, or from about 25 wt. % to about 90 wt. % or from about 40 wt. % to about 85 wt. %, for example. In one embodiment, the multi-component catalyst system includes less than about 25 wt. % or less than about 15 wt. % of the second component. In another embodiment, the multi-component catalyst system includes at least about 20 wt. % or at least about 35 wt. % of the second component.

Activation

In certain embodiments, the methods described herein further include contacting one or more of the catalyst components with a catalyst activator, herein simply referred to as an "activator". In one or more embodiments, the activator includes a "first activator", a "second activator" or a combination thereof. Alternatively, the activator may include a single composition capable of activating both the first catalyst component and the second catalyst component.

For example, the metallocene catalysts may be activated with a metallocene activator for subsequent polymerization. As used herein, the term "metallocene activator" is defined to be any compound or combination of compounds, supported or unsupported, which may activate a single-site catalyst compound (e.g., metallocenes, Group 15 containing catalysts, etc.) This may involve the abstraction of at least one leaving group (A group in the formulas/structures above, for example) from the metal center of the catalyst component. The metallocene catalysts are thus activated towards olefin polymerization using such activators.

Embodiments of such activators include Lewis acids, such as cyclic or oligomeric polyhydrocarbylaluminum oxides, non-coordinating ionic activators (NCA), ionizing activators, stoichiometric activators, combinations thereof or any other compound that may convert a neutral metallocene catalyst component to a metallocene cation that is active with respect to olefin polymerization.

The Lewis acids may include alumoxane (e.g., "MAO"), modified alumoxane (e.g., "TIBAO") and alkylaluminum compounds, for example. Non-limiting examples of aluminum alkyl compounds may include trimethylaluminum, triethylaluminum, triisobutylaluminum, tri-n-hexylaluminum and tri-n-octylaluminum, for example.

Ionizing activators are well known in the art and are described by, for example, *Eugene You-Xian Chen & Tobin J. Marks, Cocatalysts for Metal-Catalyzed Olefin Polymerization. Activators, Activation Processes, and Structure-Activity Relationships* 100(4) CHEMICAL REVIEWS 1391-1434 (2000). Examples of neutral ionizing activators include Group 13 tri-substituted compounds, in particular, tri-substituted boron, tellurium, aluminum, gallium and indium compounds and mixtures thereof (e.g., tri(n-butyl)ammoniumtetrakis(pentafluorophenyl)borate and/or trisperfluorophenyl boron metalloid precursors), for example. The substituent groups may be independently selected from alkyls, alkenyls, halogen, substituted alkyls, aryls, arylhalides, alkoxy and halides, for example. In one embodiment, the three groups are independently selected from halogens, mono or multicyclic (including halosubstituted) aryls, alkyls, alkenyl compounds and mixtures thereof, for example. In another embodiment, the three groups are selected from $C_1$ to $C_{20}$ alkenyls, $C_1$ to $C_{20}$ alkyls, $C_1$ to $C_{20}$ alkoxys, $C_3$ to $C_{20}$ aryls and combinations thereof, for example. In yet another embodiment, the three groups are selected from the group highly halogenated $C_1$ to $C_4$ alkyls, highly halogenated phenyls, and highly halogenated naphthyls and mixtures thereof, for example. By "highly halogenated", it is meant that at least 50% of the hydrogens are replaced by a halogen group selected from fluorine, chlorine and bromine.

Illustrative, not limiting examples of ionic ionizing activators include trialkyl-substituted ammonium salts (e.g., triethylammoniumtetraphenylborate, tripropylammoniumtetraphenylborate, tri(n-butyl)ammoniumtetraphenylborate, trimethylammoniumtetra(p-tolyl)borate, trimethylammoniumtetra(o-tolyl)borate, tributylammoniumtetra(pentafluorophenyl)borate, tripropylammoniumtetra(o,p-dimethylphenyl)borate, tributylammoniumtetra(m,m-dimethylphenyl)borate, tributylammoniumtetra(p-tri-fluoromethylphenyl)borate, tributylammoniumtetra(pentafluorophenyl)borate and tri(n-butyl)ammoniumtetra(o-tolyl)borate), N,N-dialkylanilinium salts (e.g., N,N-dimethylaniliniumtetraphenylborate, N,N-diethylaniliniumtetraphenylborate and N,N-2,4,6-pentamethylaniliniumtetraphenylborate), dialkyl ammonium salts (e.g., diisopropylammoniumtetrapentafluorophenylborate and dicyclohexylammoniumtetraphenylborate), triaryl phosphonium salts (e.g., triphenylphosphoniumtetraphenylborate, trimethylphenylphosphoniumtetraphenylborate and tridimethylphenylphosphoniumtetraphenylborate) and their aluminum equivalents, for example.

In yet another embodiment, an alkylaluminum compound may be used in conjunction with a heterocyclic compound. The ring of the heterocyclic compound may include at least one nitrogen, oxygen, and/or sulfur atom, and includes at least one nitrogen atom in one embodiment. The heterocyclic compound includes 4 or more ring members in one embodiment, and 5 or more ring members in another embodiment, for example.

The heterocyclic compound for use as an activator with an alkylaluminum compound may be unsubstituted or substituted with one or a combination of substituent groups. Examples of suitable substituents include halogens, alkyls, alkenyls or alkynyl radicals, cycloalkyl radicals, aryl radicals, aryl substituted alkyl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals or any combination thereof, for example.

Non-limiting examples of hydrocarbon substituents include methyl, ethyl, propyl, butyl, pentyl, hexyl, cyclopentyl, cyclohexyl, benzyl, phenyl, fluoromethyl, fluoroethyl, difluoroethyl, iodopropyl, bromohexyl or chlorobenzyl, for example.

Non-limiting examples of heterocyclic compounds utilized include substituted and unsubstituted pyrroles, imidazoles, pyrazoles, pyrrolines, pyrrolidines, purines, carbazoles, indoles, phenyl indoles, 2,5-dimethylpyrroles, 3-pentafluorophenylpyrrole, 4,5,6,7-tetrafluoroindole or 3,4-difluoropyrroles, for example.

Combinations of activators are also contemplated by the invention, for example, alumoxanes and ionizing activators in combinations. Other activators include aluminum/boron complexes, perchlorates, periodates and iodates including their hydrates, lithium (2,2'-bisphenyl-ditrimethylsilicate)-4T-HF and silylium salts in combination with a non-coordinating compatible anion, for example. In addition to the compounds listed above, methods of activation, such as using radiation and electro-chemical oxidation are also contemplated as activating methods for the purposes of enhancing the activity and/or productivity of a single-site catalyst compound, for example. (See, U.S. Pat. No. 5,849,852, U.S. Pat. No. 5,859,653, U.S. Pat. No. 5,869,723 and WO 98/32775.)

The catalyst may be activated in any manner known to one skilled in the art. For example, the catalyst and activator may be combined in molar ratios of activator to catalyst of from 1000:1 to 0.1:1, or from 500:1 to 1:1, or from about 100:1 to about 250:1, or from 150:1 to 1:1, or from 50:1 to 1:1, or from 10:1 to 0.5:1 or from 3:1 to 0.3:1, for example.

Support

The activators may or may not be associated with or bound to a support, either in association with one or more catalyst component or separate from the catalyst component(s), such as described by *Gregory G. Hlatky, Heterogeneous Single-Site Catalysts for Olefin Polymerization* 100(4) *CHEMICAL REVIEWS* 1347-1374 (2000).

For example, each different catalyst component may reside on a single support particle, so that the multi-component catalyst is a supported multi-component catalyst. However, as used herein, the term multi-component catalyst also broadly includes a system or mixture in which one of the catalysts (e.g., the first catalyst component) resides on one collection of support particles and another catalyst (e.g. the second catalyst component) resides on another collection of support particles. In the latter instance, the two supported catalysts are introduced to a single reactor, either simultaneously or sequentially and polymerization is conducted in the presence of the multi-component catalyst. In certain embodiments, an unsupported version of the multi-component catalyst described herein can be used in a polymerization process, i.e., in which the monomers are contacted with a multi-component catalyst that is not supported.

The support materials may include talc, inorganic oxides, clays and clay minerals, ion-exchanged layered compounds, diatomaceous earth compounds, zeolites or a resinous support material, such as a polyolefin, for example.

Specific inorganic oxides include silica, alumina, magnesia, titania and zirconia, which may be physically or chemically mixed, for example. The inorganic oxides used as support materials may have an average particle size of from 5 microns to 600 microns or from 10 microns to 100 microns, a surface area of from 50 $m^2/g$ to 1,000 $m^2/g$ or from 100 $m^2/g$ to 400 $m^2/g$ and a pore volume of from 0.5 cc/g to 3.5 cc/g or from 0.5 cc/g to 2 cc/g, for example.

Methods for supporting metallocene catalysts are generally known in the art. (See, U.S. Pat. No. 5,643,847, U.S. patent Ser. No. 09/184,358 and Ser. No. 09/184,389, which are incorporated by reference herein.)

Various methods can be used to affix two different catalysts to a support to form a multi-component catalyst (also referred to as a "mixed catalyst"). For example, one procedure for preparing a supported multi-component catalyst can include providing a supported first catalyst component, contacting a slurry including the first catalyst component and a non-polar hydrocarbon with a mixture (solution or slurry) that includes the second catalyst component, which may also include an activator. The procedure may further include drying the resulting product that includes the first and second catalyst components and recovering a multi-component catalyst composition. Alternatively, it is contemplated that the first and second catalyst components may be independently fed to one or more reaction zones, so long as each reaction zone includes a multi-component system as described herein.

Optionally, the support material, one or more of the catalyst components, the catalyst system or combinations thereof, may be contacted with one or more scavenging compounds prior to or during polymerization. The term "scavenging compounds" is meant to include those compounds effective for removing impurities (e.g., polar impurities) from the subsequent polymerization reaction environment. Impurities may be inadvertently introduced with any of the polymerization reaction components, particularly with solvent, monomer and catalyst feed, and adversely affect catalyst activity and stability. Such impurities may result in decreasing, or even elimination, of catalytic activity, for example. The polar impurities or catalyst poisons may include water, oxygen and metal impurities, for example.

The scavenging compound may include an excess of the aluminum containing compounds described above, or may be additional known organometallic compounds, such as Group 13 organometallic compounds. For example, the scavenging compounds may include triethyl aluminum (TEAl), triisobutyl aluminum (TIBAl), methylalumoxane (MAO), isobutyl aluminoxane, dialkyl zinc compounds and tri-n-octyl aluminum. In one specific embodiment, the scavenging compound is TEAl.

In one embodiment, the amount of scavenging compound is minimized during polymerization to that amount effective to enhance activity and avoided altogether if the feeds and polymerization medium may be sufficiently free of impurities.

Polymerization Processes

Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. Other monomers include ethylenically unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process with the exception that the liquid medium is also the reactant (e.g., monomer) in a bulk phase process. However, a process may be a bulk process, a slurry process or a bulk slurry process, for example.

In a specific embodiment, a slurry process or a bulk process may be carried out continuously in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 50 bar or from about 35 bar to about 45 bar and a temperature of from about 38° C. to about 121° C., for example. Reaction heat may be removed through the loop wall via any method known to one skilled in the art, such as via a double-jacketed pipe or heat exchanger, for example.

Alternatively, other types of polymerization processes may be used, such as stirred reactors in series, parallel or combinations thereof, for example. Upon removal from the reactor, the polymer may be passed to a polymer recovery system for further processing, such as addition of additives and/or extrusion, for example.

Further, it has been discovered that by varying the monomer and/or comonomer feed rates, the xylene soluble level can be controlled. In particular, it has been discovered that by increasing the ethylene feed rate in propylene polymerization processes, the xylene solubles level of the resulting polymer can be increased. Unexpectedly, it was found that at higher levels of ethylene (e.g., greater than 1 wt. % or 2 wt. %), phase separation of the resultant polymer was observed. Therefore, embodiments of the invention are capable of forming in-situ heterophasic polymers. As used herein, the term "heterophasic" generally refers to a polymer having two or more phases. Similar to impact copolymers (which incorporate a rubber phase into a polymer matrix), the heterophasic polymers described herein are expected to experience improved impact properties, while experiencing the benefit of in-situ (e.g., single reaction zone) formation.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene (e.g., syndiotactic, atactic and isotactic) and polypropylene copolymers, for example.

The polymers may exhibit bimodal molecular weight distributions (i.e., they are bimodal polymers). For example, a single composition including a plurality of molecular weight peaks is considered to be a "bimodal" polyolefin. In one embodiment, the single composition exhibits a plurality of melting points.

The polymers can have a variety of compositions, characteristics and properties. At least one of the advantages of the multi-component catalysts is that the process utilized can be tailored to form a polymer composition having a desired set of properties. A non-limiting discussion of such properties follows.

In one embodiment, the polymers include propylene polymers. In one embodiment, the propylene polymer includes isotactic polypropylene.

The propylene polymers may include propylene homopolymers. Unless otherwise specified, the term "propylene homopolymers" refers to those polymers composed primarily of propylene and limited amounts of other comonomers, such as ethylene, wherein the comonomers make up less than 0.5 wt. % or less than about 0.1 wt. % by weight of polymer.

As used herein, the term "stereospecific polymer" refers to a polymer having a defined arrangement of molecules in space, such as isotactic and syndiotactic polypropylene, for example. The term "tacticity" refers to the arrangement of pendant groups in a polymer. For example, a polymer is "atactic" when its pendant groups are arranged in a random fashion on both sides of the chain of the polymer. In contrast, a polymer is "isotactic" when all of its pendant groups are arranged on the same side of the chain and "syndiotactic" when its pendant groups alternate on opposite sides of the chain.

The propylene homopolymers may exhibit a xylene solubles level that is greater than about 3 wt. %, or 4 wt. % or 5 wt. %, for example.

The propylene homopolymers unexpectedly exhibit relatively constant melting points at varying xylene solubles levels. For example, the propylene polymers may exhibit melting temperatures of from about 135° C. to about 150° C., or from about 138° C. to about 148° C. or from about 140° C. to about 145° C.

Alternatively, the propylene polymers may include propylene random copolymers. As used herein, the term "propylene random copolymers" refers to random copolymers including ethylene at a greater level than that defined as a propylene homopolymer. In one embodiment, the propylene random copolymers include at least about 2 wt. %, or at least about 5 wt. %, or at least about 8 wt. % or at least about 11 wt. % ethylene, for example.

Unexpectedly, it has been discovered that the propylene random copolymers generally exhibit phase separation when analyzed by microscopy. See, FIG. 1. Such phase separation is comparable to that of ethylene propylene impact copolymers formed in series reactors. Therefore, it is believed that the propylene random copolymers of the present invention are heterophasic copolymers formed in-situ (in a single reaction zone).

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include melt spinning, solution spinning and melt blown fiber operations for use in woven or non-woven form to make filters, diaper fabrics, medical garments and geotextiles, for example. Extruded articles include medical tubing, wire and cable coatings, geomembranes and pond liners, for example. Molded articles include single and multi-layered constructions in the form of bottles, tanks, large hollow articles, rigid food containers and toys, for example.

In one specific embodiment, the polymers are useful for heat seal applications. In another specific embodiment, the polymers are useful for injection molding.

EXAMPLES

Bimodal polyolefin compositions were formed.

As used in the examples, metallocene type "$M_1$" refers to rac-dimethylsilylbis(2-methyl-4-phenyl-1-indenyl)zirconium dichloride.

As used in the examples, metallocene type "$M_2$" refers to diphenylmethylene(fluorenyl)(cyclopentadienyl)zirconium dichloride.

Unless otherwise designated herein, all testing methods are the current methods at the time of filing.

As used in the examples, as specified, silica refers to G952 silica that was obtained from Grace or P10 silica that was obtained from Fuji Silysia Chemical LTD. The support was prepared by drying the silica at 150° C. under nitrogen for about 12 hours. The dried silica was stored at room temperature under nitrogen and then 20 g of the silica was introduced to a 500 mL round-bottom flask equipped with a stir bar. The preparation then included adding 250 mL of dry toluene to the flask and stirring the resulting suspension at room temperature for about 3 minutes. The preparation then included dropwise addition of MAO in toluene (30 wt. %) to the flask at room temperature to result in an MAO/SiO$_2$ weight ratio of 0.75:1.0. The resulting mixture was then stirred for 30 minutes at room temperature and then heated to 115° C. for 4 hours. The slurry was then filtered through a glass frit. The resulting solid was washed with 20 g of dry toluene and three times with 20 g of iso-hexane. The resulting support was then dried under vacuum at room temperature for another 3 hours.

Supported multi-component catalyst systems were prepared by mixing metallocene type $M_1$ with metallocene type $M_2$ in a weight ratio as indicated to form a mixture. The metallocene mixture was then co-supported on a support composition (0.75 MAO/1.0 SiO$_2$). The preparation then included adding mineral oil to the mixture to form a catalyst slurry.

The catalyst was then supported by introducing 2 g of the support into a 100 mL flask and adding 50 g of dry toluene to the flask under nitrogen and stirring the resulting suspension at room temperature. The metallocene mixture (40 mg total in 10 g of toluene) was then added to the suspension and stirred for 2 hours at ambient temperature under nitrogen. The resulting slurry was then filtered through a glass frit filter and washed 3 times with 15 g of dry toluene and 2 times with 15 g of dry hexane. The resulting dark red solid was then dried under vacuum at room temperature for one hour and then slurried in mineral oil to give a 10 wt. % slurry.

The resulting catalysts were then contacted with propylene monomer and ethylene monomer to form a polymer in a 500 cc autoclave reactor. (0.17 kg of propylene, 0.18 mol % H$_2$, mg catalyst, 0.09 mmol TEAl in 0.5 L reactor at 60° C. for 30 minutes with in-situ prepolymerization.)

Lab scale Propylene Copolymerizations: Each catalyst slurry was then contacted with propylene monomer and ethylene monomer to form copolymer (lab scale reactor). The polymerization conditions and results of each polymerization follow in Table 1.

TABLE 1

| Run # | Wt. % C$_2$ in feed | $M_1$:$M_2$ wt. ratio | Xylene Soluble (%) | Molecular Weight ($M_w$) | Melting Point ($T_m$ in ° C.) | MFR (g/10 min) | Wt. % C$_2$ in Polymer | Activity (g/g/h) |
|---|---|---|---|---|---|---|---|---|
| 1 | 0 | 9:1 | 0.73 | 72,300 | 148.0 | NR | NR | NR |
| 2 | 0.5 | 9:1 | 4.17 | 200,936 | 147.0 | NR | NR | 10,500 |
| 3 | 1.0 | 9:1 | NR | NR | 143.7 | NR | NR | NR |
| 4 | 1.5 | 9:1 | NR | NR | 141.7 | NR | NR | 6,500 |
| 5 | 2.0 | 9:1 | 5.62 | 135,043 | 138.7 | NR | NR | 7,500 |
| 6 | 1.3 | 4:1 | 13.7 | 288,069 | 141.4 | 5.6 | 2.2 | 8,500 |
| 7 | 2.0 | 4:1 | 14.7 | 285,336 | 137.7 | 5.1 | 3.1 | 7,600 |

*Rxn time 30 min, Rxn temp 60° C., hydrogen 0.18 mol % for runs 1-5, hydrogen 0.03 mol % for runs 6 and 7

It was observed that the addition of small amounts of ethylene (0.5 wt. %) is sufficient to significantly increase the xylene soluble fraction of the resulting polymer (e.g., from 0.7% to 4.2%).

Unexpectedly, it was further observed that the melting temperature of the formed polymer remained quite high (e.g., the $T_m$ did not change significantly with a change in xylene solubles).

It was further observed that the xylene solubles level can be adjusted by changing the ethylene feed ratio and/or the $M_1:M_2$ ratio.

Pilot Scale Propylene Copolymerizations: The P10 silica was dried at 200° C. for four hours. The silica (600 g) was then added to 20 L Buchi vessel with toluene to form a slurry. Addition of MAO (1,500 kg of 30 wt. % in toluene) was carried out and the slurry brought to 125° C. for 4 hours. The slurry was then filtered and washed with toluene (3×8 kg). The solids were slurried in toluene and a solution of the metallocenes (21 g, 4:1 weight ratio of $M_1$ to $M_2$) in toluene was added and allowed to stir for 2 hours. The slurry was then filtered and washed with toluene (3×8 kg) and isohexane (3×8 kg) and then reslurried in mineral oil. The catalyst pot was charged with 5.1 kg of the catalyst slurry (9.9 wt. %) and then diluted to about 0.7 wt. % with hexane. The catalyst was introduced to the reactor, with the hydrogen concentration at 0.13 mol %, propylene feed rate of 140 lb/h, and a TEAl in the feed at 113 ppm wt. Ethylene was added at 0.45 lb/hr for 5 hours and at 1.0 lb/hr for 4.5 hours and then increased to 2.4 lb/hr for another 24 hours. The polymerization conditions and results of each polymerization follow in Table 2.

TABLE 2

| Run | Mol % $C_2$ in feed | $M_1:M_2$ wt. ratio | Xylene Soluble (%) | $T_r$ (° C.) | Melting Point (° C.) | MFR (g/10 min) | Wt. % $C_2$ in Polymer | Izod Impact-Notched@ 23° C.(ft-lb/in) | Flex Mod (psi) | 45°Gloss |
|---|---|---|---|---|---|---|---|---|---|---|
| 8 | 2.6 | 4:1 | 9 | 105 | 142 | 8.5 | 2.1 | 0.59 | 130 | 53 |

It was observed that the sample from run 8 experienced improved room temperature impact strength over conventional random copolymers.

While the foregoing is directed to embodiments of the present invention, other and further embodiments of the invention may be devised without departing from the basic scope thereof and the scope thereof is determined by the claims that follow.

What is claimed is:

1. A polymerization process comprising:
   providing a multi-component catalyst system consisting essentially of:
   a first catalyst component generally represented by the formula $XCp^ACp^BMA_n$, wherein X is a structural bridge, $Cp^A$ and $Cp^B$ each denote a cyclopentadienyl group or derivatives thereof, each being the same or different and which may be either substituted or unsubstituted, M is a transition metal and A is an alkyl, hydrocarbyl or halogen group and n is an integer between 0 and 4;
   a second catalyst component generally represented by the formula $XCp^ACp^BMA_n$, wherein X is a structural bridge, $Cp^A$ and $Cp^B$ each denote a cyclopentadienyl group or derivatives thereof, each being the same or different and which may be either substituted or unsubstituted, M is a transition metal and A is an alkyl, hydrocarbyl or halogen group and n is an integer between 0 and 4 and wherein the second catalyst component exhibits a higher ethylene response than the first catalyst component and is capable of forming a higher level of xylene solubles than the first catalyst component;
   a support, wherein the support consists essentially of silica, alumina, magnesia, titania, zirconia or combinations thereof; and
   an activator;
   introducing the multi-component catalyst system to a reaction zone;
   introducing propylene monomer to the reaction zone;
   introducing ethylene monomer to the reaction zone;
   contacting the multi-component catalyst system with the propylene monomer and the ethylene monomer to form a heterophasic copolymer; and
   withdrawing the heterophasic copolymer from the reaction zone.

2. The process of claim 1, wherein the first catalyst component comprises an isotactic directing metallocene catalyst.

3. The process of claim 1, wherein the second catalyst component comprises a syndiotactic directing metallocene catalyst.

4. The process of claim 1, wherein the second catalyst component is selected from diphenylmethylene(fluorenyl)(cyclopentadienyl)zirconium dichloride, diphenylmethylene(2,7-di-tert-butyl-fluorenyl)(cyclopentadienyl)zirconium dichloride, diphenylmethylene(3,6-di-tert-butyl-fluorenyl)(cyclopentadienyl)zirconium dichloride and combinations thereof.

5. The process of claim 1, wherein the second catalyst component comprises a CpFlu type catalyst.

6. The process of claim 1, wherein the second catalyst component is selected from dimethylmethylene (fluorenyl)(2-methyl-4-tert-butyl-cyclopentadienyl)zirconium dichloride, dimethylmethylene (3,6-di-tert-butyl-fluorenyl)(2-methyl-4-tert-butyl-cyclopentadienyl)zirconium dichloride, dimethylmethylene (2,7-di-tert-butyl-fluorenyl)(2-methyl-4-tert-butyl-cyclopentadienyl)zirconium dichloride and combinations thereof combinations thereof.

7. The process of claim 1, wherein the first catalyst component is selected from dimethylsilylbis(2-methyl-4-phenyl-indenyl)zirconium dichloride, dimethylsilylbis(2-methyl-indenyl)zirconium dichloride, dimethylsilylbis(2-methyl-4,5-benzo-indenyl)zirconium dichloride and combinations thereof.

8. A polymerization process comprising:
   providing a multi-component catalyst system consisting essentially of:
   a first catalyst component generally represented by the formula $XCp^ACp^BMA_n$, wherein X is a structural bridge, $Cp^A$ and $Cp^B$ each denote a cyclopentadienyl group or derivatives thereof, each being the same or different and which may be either substituted or unsubstituted, M is a transition metal and A is an alkyl, hydrocarbyl or halogen group and n is an integer between 0 and 4;

a second catalyst component generally represented by the formula $XCp^A Cp^B MA_n$, wherein X is a structural bridge, $Cp^A$ and $Cp^B$ each denote a cyclopentadienyl group or derivatives thereof, each being the same or different and which may be either substituted or unsubstituted, M is a transition metal and A is an alkyl, hydrocarbyl or halogen group and n is an integer between 0 and 4 and wherein the second catalyst component exhibits a higher ethylene response than the first catalyst component and is capable of forming a higher level of xylene solubles than the first catalyst component;

a support, wherein the support consists essentially of silica, alumina, magnesia, titania, zirconia or combinations thereof; and an activator;

introducing the multi-component catalyst system to a reaction zone;

introducing an olefin monomer to the reaction zone; and contacting the multi-component catalyst system with an olefin monomer to form a polyolefin.

9. The process of claim 8, wherein the first catalyst component comprises an isotactic directing metallocene catalyst.

10. The process of claim 8, wherein the first catalyst component comprises a metallocene catalyst capable of producing a polyolefin comprising a melting point of from about 120° C. to about 167° C.

11. The process of claim 8, wherein the second catalyst component comprises a syndiotactic directing metallocene catalyst.

12. The process of claim 8, wherein the second catalyst component is selected from diphenylmethylene(fluorenyl)(cyclopentadienyl)zirconium dichloride, diphenylmethylene(2,7-di-tert-butyl-fluorenyl)(cyclopentadienyl)zirconium dichloride, diphenylmethylene(3,6-di-tert-butyl-fluorenyl)(cyclopentadienyl)zirconium dichloride and combinations thereof.

13. The process of claim 8, wherein the second catalyst component comprises a CpFlu type catalyst.

14. The process of claim 8, wherein the second catalyst component is selected from dimethylmethylene (fluorenyl)(2-methyl-4-tert-butyl-cyclopentadienyl)zirconium dichloride, dimethylmethylene (3,6-di-tert-butyl-fluorenyl)(2-methyl-4-tert-butyl-cyclopentadienyl)zirconium dichloride, dimethylmethylene (2,7-di-tert-butyl-fluorenyl)(2-methyl-4-tert-butyl-cyclopentadienyl)zirconium dichloride and combinations thereof combinations thereof.

15. The process of claim 8, wherein the first catalyst component is selected from dimethylsilylbis(2-methyl-4-phenyl-indenyl)zirconium dichloride, dimethylsilylbis(2-methyl-indenyl)zirconium dichloride, dimethylsilylbis(2-methyl-4,5-benzo-indenyl)zirconium dichloride and combinations thereof.

16. The process of claim 8, wherein the olefin monomer comprises propylene.

17. The process of claim 16, wherein the olefin monomer comprises a second monomer selected from ethylene, butene and combinations thereof.

18. The process of claim 17 further comprising a rate of second monomer incorporation of at least about 80% based on the amount of second monomer introduced.

19. The process of claim 18 further comprising increasing the xylene solubles level of the polyolefin, wherein the polyolefin exhibits a melting point that is essentially constant regardless of xylene soluble level.

20. The process of claim 18, wherein the polyolefin comprises polypropylene and at least about 2 wt. % polyethylene.

21. The process of claim 20, wherein the polyolefin exhibits phase separation.

* * * * *